US007979299B1

(12) United States Patent
Mehta et al.

(10) Patent No.: US 7,979,299 B1
(45) Date of Patent: Jul. 12, 2011

(54) METHODS AND APPARATUS FOR OPTIMIZING MARKDOWN PRICING

(75) Inventors: Shail Mehta, Boston, MA (US); Reed B. Breneman, Kings Mills, OH (US); John C. Stauffer, Framingham, MA (US); Douglas K. McIver, Cambridge, MA (US); Vishwamitra S. Ramakrishnan, Belmont, MA (US); Zhidong Lu, Boxboro, MA (US); Pavandeep S. Kalra, Shrewsbury, MA (US); Brian Sheppard, Concord, MA (US)

(73) Assignee: Oracle Int'l. Corp., Redwood Shores, CA (US)

( * ) Notice: Subject to any disclaimer, the term of this patent is extended or adjusted under 35 U.S.C. 154(b) by 1437 days.

(21) Appl. No.: 11/158,264

(22) Filed: Jun. 21, 2005

(51) Int. Cl.
*G06Q 99/00* (2006.01)
(52) U.S. Cl. .................. 705/7.29; 705/7.35; 705/400
(58) Field of Classification Search ............... 705/7, 10, 705/400
See application file for complete search history.

(56) References Cited

U.S. PATENT DOCUMENTS

| | | | | |
|---|---|---|---|---|
| 6,910,017 | B1 * | 6/2005 | Woo et al. ................ | 705/10 |
| 7,092,929 | B1 * | 8/2006 | Dvorak et al. .............. | 705/28 |
| 7,155,402 | B1 * | 12/2006 | Dvorak ..................... | 705/10 |
| 7,171,376 | B2 * | 1/2007 | Ramakrishnan ............ | 705/10 |
| 7,523,047 | B1 * | 4/2009 | Neal et al. ................ | 705/10 |
| 7,788,124 | B2 * | 8/2010 | Fotteler et al. ............ | 705/10 |
| 2003/0028437 | A1 * | 2/2003 | Grant et al. ............... | 705/26 |
| 2003/0229502 | A1 * | 12/2003 | Woo ......................... | 705/1 |
| 2005/0096963 | A1 * | 5/2005 | Myr et al. ................. | 705/10 |
| 2005/0194431 | A1 * | 9/2005 | Fees et al. ................. | 235/375 |
| 2006/0161504 | A1 * | 7/2006 | Walser et al. ............. | 705/400 |

OTHER PUBLICATIONS

Federgruen, Awi and Heching, Aliza. Combined Pricing and Inventory Control Under Uncertainty. Columbia University, New York, New York. Operations Research vol. 47, No. 3, May-Jun. 1999. Retrieved from @1999 Informs.*
Moritz Fleischmann, Joseph M. Hall, and David F. Pyke. Smart Pricing: Linking Pricing Decisions with Operational Insights. ERIM Report Series Research in Management. ERS-2004-001-LIS. Published 2004. Erasmus Research Institute of Management, Rotterdam School of Management/Rotterdam School of Economics, The Netherlands.*

* cited by examiner

*Primary Examiner* — Beth V Boswell
*Assistant Examiner* — Stephanie Zagarella

(57) ABSTRACT

The invention provides methods and apparatus for optimizing markdown scheduling that group multiple retail sites into bins (or buckets) for purposes of scheduling markdown pricing on an item (or group of related items) sold by those sites. The groupings can be based, for example, on a metric that is a function of the current inventory of the item (or items) and its expected sales at each site. A markdown schedule is generated for the combined grouping of stores in each bucket, rather than for the individual stores that make up that bucket, thereby speeding price optimization determination. A report of those schedules can be used, for example, by pricing managers or other personnel to set prices at the sites. Alternatively, or in an addition, the schedules can be used in conjunction with an inventory control system to set prices for the items and/or on RFID or other electronic shelf displays.

14 Claims, 3 Drawing Sheets

METHODS AND APPARATUS FOR OPTIMIZING MARKDOWN PRICING

BACKGROUND OF THE INVENTION

The invention pertains to digital data processing and, more particularly, to methods and apparatus for optimizing determination of markdown schedules for goods sold by multiple retail sites. The invention has application, by way of non-limiting example, in facilitating pricing decisions by retailing chains and other enterprises.

Markdown pricing is the retailers' remedy for stagnant inventory. It can help move aged inventory off the shelf at the end of the selling season and/or make room for better selling items in the middle of the season. The difficulty retailers face is knowing when and how much to bring prices down. Markdowns that are too early or too severe will result in loss of profit, just as will those that are too late or too cautious.

Woo, "Markdown Management" (U.S. Patent Publication 20030229502A1, Dec. 11, 2003), assigned to the assignee hereof, suggests a markdown methodology that calls for estimating the price elasticity of sales of an item and, based on that, determining the maximum gross margin that can be attained for the item. That figure is then used in connection with setting or evaluating markdown scenarios for the item.

Grant, "Price Decision Support" (U.S. Patent Publication US20030028437A1, Feb. 6, 2003), also assigned to the assignee hereof, suggests employing a user interface to display markdown price recommendations that will achieve optimal gross margins. The user inputs proposed modifications to the recommendations and, thereby, investigates their impact, e.g., on gross margin.

While the above and other markdown technologies of the assignee have achieved widespread praise and acceptance in the industry, there remains room for improvement. Such is the case, by way of example, in determining markdown pricing for regional and national retailing chains, which may have tens or hundreds of stores, each selling hundreds or thousands of items. Prior art methodologies for determining markdown schedules for that many items across that many stores can require significant processing power and/or time.

An object of this invention, then, is to provide improved methods and apparatus for digital data processing. A more particular object is to provide such methods and apparatus for markdown scheduling.

A related object of the invention is to provide such method and apparatus as speed markdown pricing for regional, national and international retailing chains, among others, with a multitude of retail sites and/or selling a multitude of items.

Still another object is to provide such methods and apparatus as can be readily implemented in existing and future business process systems, automated or otherwise.

SUMMARY OF THE INVENTION

The foregoing are among the objects attained by the invention which provides, in one aspect, methods for optimizing markdown scheduling of an item (or group of related items) sold by multiple retail sites—that is, stores and/or departments in a store, chain or other retail enterprise. The sites are combined into common groups (or bins or buckets) based, for example, on a metric that is a function of current inventory of the item (or items) and its expected sales at each site.

Markdown schedules are generated for the combined grouping of stores in each bucket, rather than for individual stores that make them up, thereby speeding markdown determination and reducing computational resource requirements. A report is generated showing these markdown schedules, for use, for example, by pricing managers or other personnel. Alternatively, or in an addition, those schedules can be used in conjunction with an inventory control system to set prices for the items at the retail sites, e.g., via point of sale (POS) terminals and/or RFID or other electronic shelf displays.

Further aspects of the invention provide methods as described above in which the markdown schedules are generated based on a multiplicative demand model.

Related aspects of the invention provide methods as described above in which the groupings are based on, by way of further example, a ratio of current inventory of the item(s) at each retail site to expected sales at that site.

Other aspects of the invention provide methods as described above in which the plural retail sites in each bucket are re-grouped in accord with pricing rules utilized by the respective sites. Those rules may include markdown calendars, promotion types, promotion dates, schedules of accepted markdowns, and/or pricing ladders, among others. Related aspects of the invention provide such methods in which plural retail sites in each bucket are further grouped in accord with seasonality and/or demand parameters of a demand model applicable to the respective sites.

Still further aspects of the invention provide apparatus and systems operating in accord with the methods above.

These and other aspects of the invention are evident in the drawings and in the discussion that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
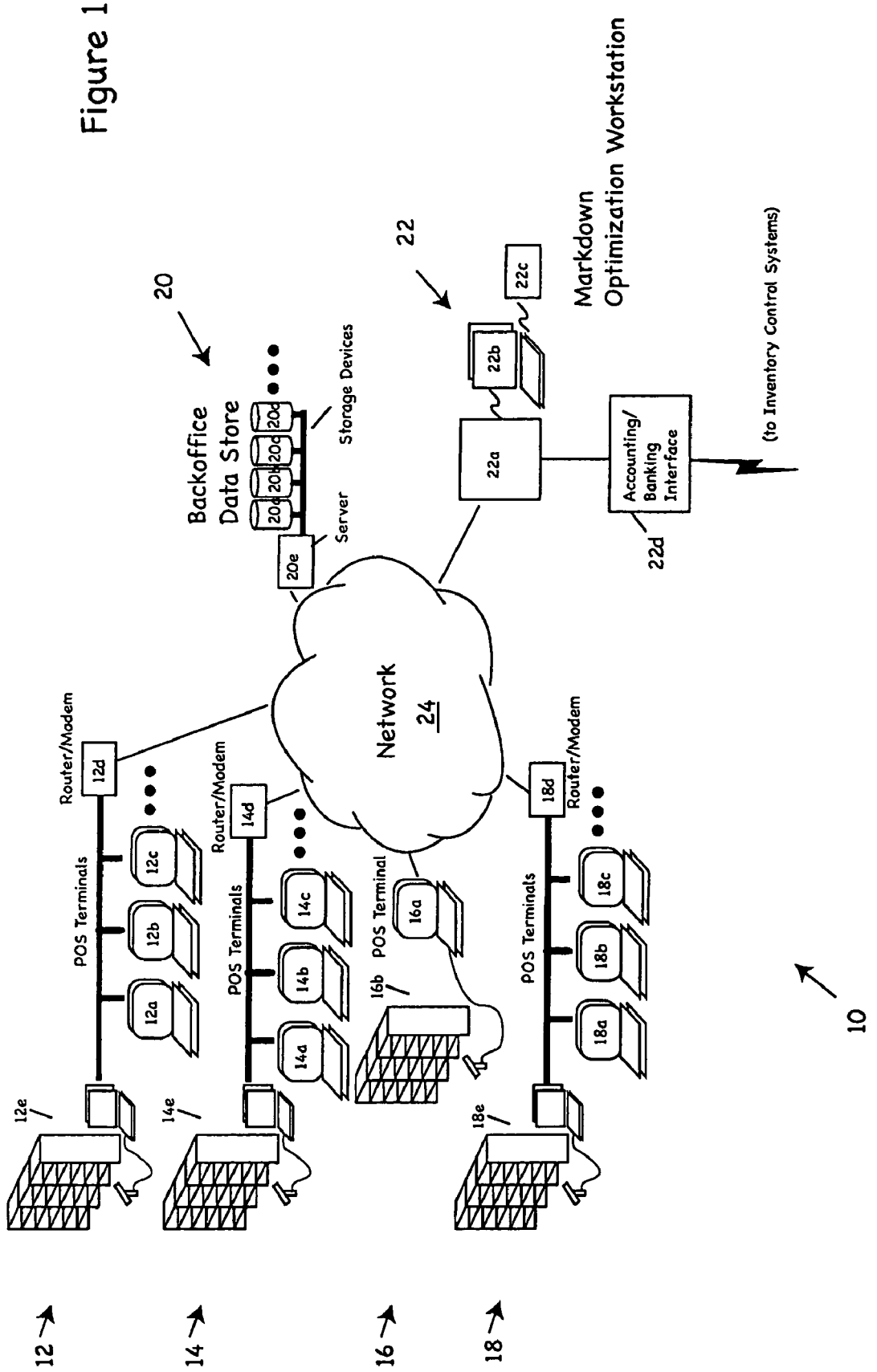
FIG. 1 depicts a retailing environment 10 in which the invention may be practiced.

FIG. 1 depicts a retailing environment 10 in which the invention can be practiced. In the illustrated embodiment, that environment is a retailing enterprise of international, national, local (or other) scope comprising retail sites 12-18. The enterprise can be a chain of commonly named and owned stores, though, it may be a looser (or tighter) collection of stores that are presumably (though not necessarily) under common control or management. Moreover, although the retail sites depicted and discussed here are stores, they may also be departments or other retail outlets (physical, virtual, online, or otherwise).

In the drawing, each site 12-18 is represented by one or more interconnected point of sale (POS) terminals 12a-18c. These provide for inventory pricing, as well as for collection of money from customers at the time of sale. Though POS terminals are used for these purposes in the illustrated embodiment, it will be appreciated that in other embodiments these functions may be exercised by other means known in the art. The POS terminals are coupled to network 24, which supports communications to an enterprise headquarters (not shown) and/or among the retail sites 12-18. The network 24 may be a WAN, Internet and/or other communications medium or collection thereof (wired, wireless, land-based, satellite-based or otherwise).

Back office data store 20 represents a repository of pricing, inventory and sales information from retail sites 12-18, as well as information regarding their pricing policies. This may be part of a general back office management function, e.g., that additionally includes overall corporate financial tracking and management, or otherwise.

Illustrated data store 20 comprises storage devices 20a-20d which are coupled to network 24 via server and/or database management system 20e. The data store and accompanying hardware/software platforms may be located at a single site, e.g., enterprise headquarters, or they may be distributed among multiple locations (including, the retail sites themselves).

In the illustrated embodiment, pricing, inventory and sales information, e.g., for item(s) for which markdown pricing is being optimized, is communicated from the POS terminals at each of the sites 12-18 to the data store 20 via router/modems 12d, 14d, 16d, 18d and network 24. In other embodiments that information may be communicated by other means.

Pricing information communicated by the retail sites 12-18 to the data store 20 may include, for each item for which markdown pricing is being optimized, item identification, price history (e.g., initial, past and current), historical sales data (e.g., from past selling seasons and/or previously in the current selling season), inventory history (e.g., initial, past and current), on-shelf quantities, item type (e.g., as indicated by UPC code, or otherwise), daily sales and returns, and so forth. More generally, the communicated pricing information represents that necessary for use in determining the binning metrics described below (or other such metrics used in practice of the invention), as well as that necessary for generating markdown schedules as described below.

Pricing policy information maintained in the data store 20 reflect when and by how much the retail sites discount the various items they sell. These policies may vary from site to site, e.g., depending on geographic location, customer demographics, store type and theme, and so forth. Though other embodiments may use different and/or additional policies, those used in the illustrated embodiment include pricing ladders, markdown calendars, promotion types and dates, and acceptable markdowns. A brief explanation of these follows:

- A pricing ladder is a schedule of prices used by a retail site for all or selected items (e.g., $1.95, $3.65, $7.65, $9.95, $11.95, $13.65, $17.65, $19.95, etc.). This may be based on conventional or proprietary notions of pricing psychology, applicable taxes, or other factors known in the art.
- A markdown calendar is a schedule of dates on which a retail site marksdown item prices. This may be absolute dates, (e.g., third Friday of every month, first day of holiday weekends, etc.), relative dates (e.g., twelve days after product introduction, thirty-five days after introduction, etc.), a combination of absolute and relative dates, or otherwise.
- Promotion types and dates refers to when and how a retail site will promote items storewide and/or among classes of goods, e.g., Spring fashion clearance sale, Summer sports sale, semi-annual storewide sale, and so forth.
- Pricing policies concerning acceptable markdowns pertain to maximum, minimum, typical, and other factors used by a retail site to determine by how much (and when) to markdown item prices. This may reflect a rule, for example, that all fashion shoes are marked down 10% six weeks after introduction, but no more than 35% within the first three months. It may further reflect, for example, that clothing accessories (such as belts, socks, etc.) are not marked down, except, during "storewide" sales.

Optimization workstation 22 comprises a personal computer, workstation, mainframe or other digital data processing system of the type commonly available in the marketplace, as programmed in accord with the teachings hereof for optimizing markdown price scheduling for item(s) sold by retail sites 12-18. The workstation 22 comprises processor section 22a (comprising a central processing unit, dynamic storage, input/output control, and the like), a monitor, keyboard and other user input/output devices 22b, and printers or other output devices 22c, networked or otherwise—again, all of the type commercially available in the marketplace.

The workstation 22 can be coupled for communications with back office data store 20, via network 24 or otherwise, to gather pricing, inventory and sales information, e.g., for item(s) for which markdown pricing is being optimized, from data store 20, directly from sites 12-18, or otherwise. Workstation 22 uses that information to optimize markdown pricing determinations among all of the sites (or a portion there) in accord with the teachings hereof.

The workstation can print the resulting markdown schedules, e.g., for use, e.g., by pricing managers and/or other personnel responsible for price setting. In preferred embodiments, those pricing schedules are transmitted to inventory control systems 12e, 14e, 16e, 18e at the retail sites, e.g., for use in setting prices at the POS terminals 12a, 12b, 12c, 14a, 14b, 14c, 16a, 18a, 18b, 18c, on electronic shelf price displays 12e, 14e, 16b, 18e at those sites, or otherwise.

Figure 2:
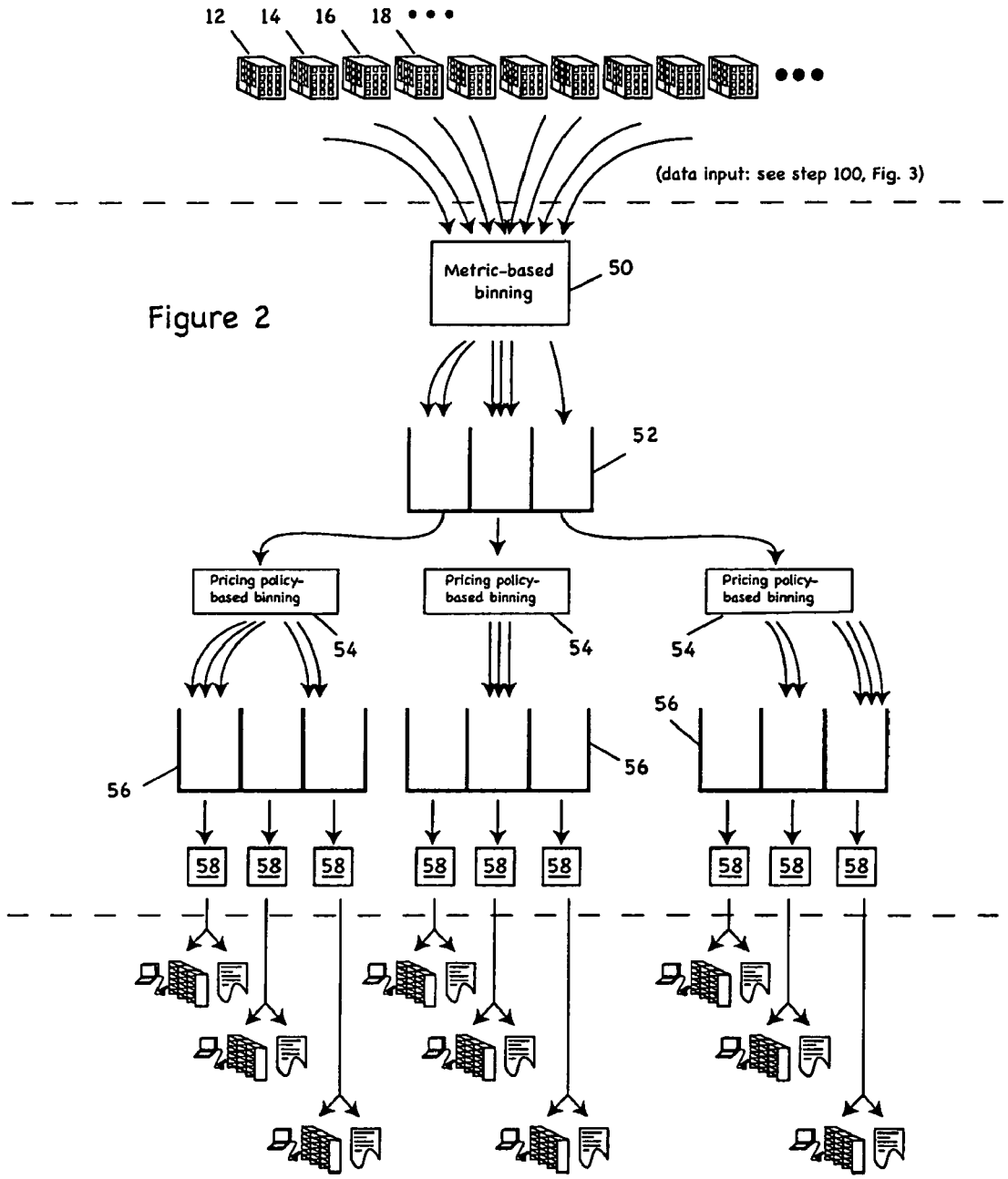
FIG. 2 depicts a data flow for optimizing markdown scheduling according to one practice of the invention.
Figure 3:
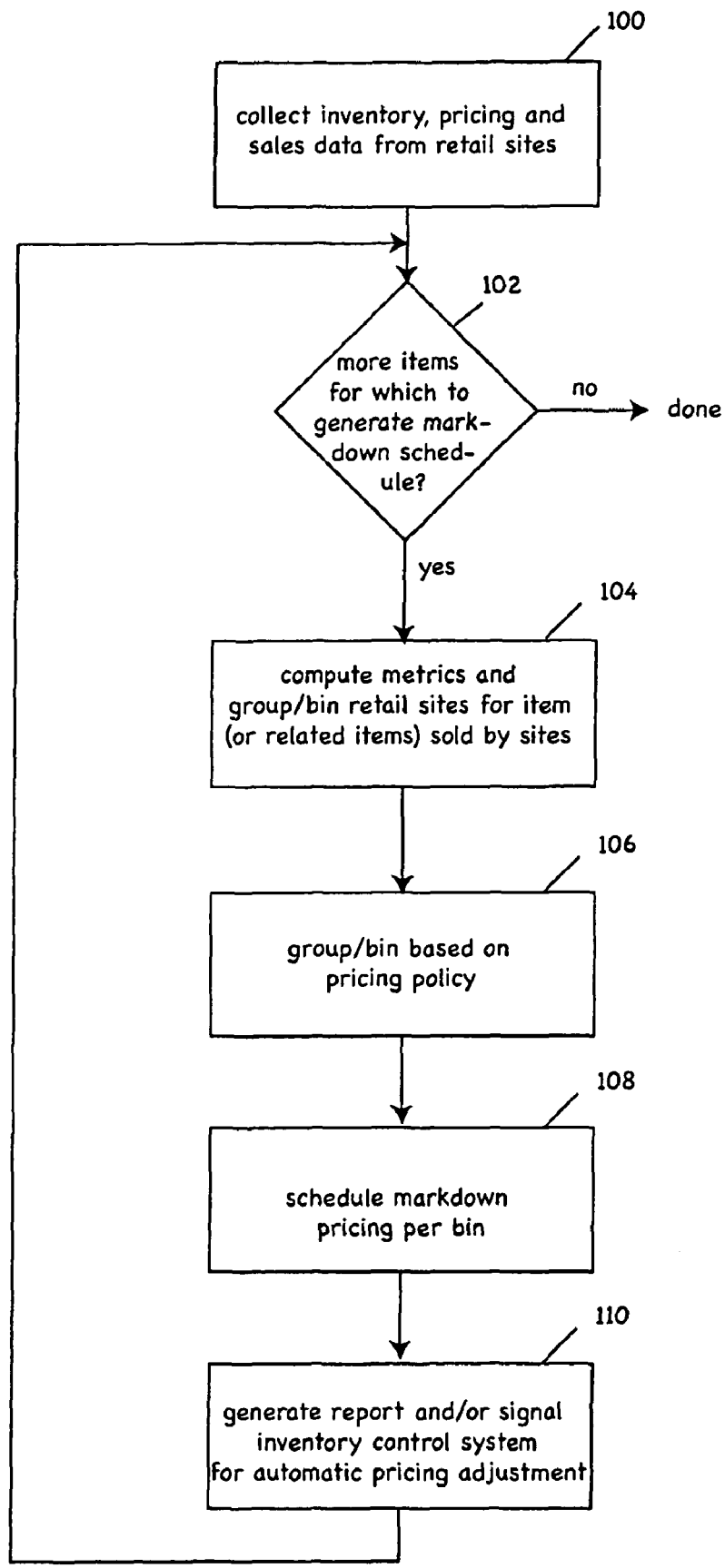
FIG. 3 is a flow chart indicating process flow for optimizing markdown scheduling according to one practice of the invention.

FIG. 2 depicts a data flow for optimizing markdown price scheduling according to one practice of the invention. FIG. 3 is a corresponding flow chart. In general, the processing and flow depicted in these drawings occurs within optimization workstation 22; though, it can be executed by other digital data processing apparatus operating in accord with the teachings hereof. Some of the processing and flow, particularly, that represented in the region of FIG. 2 above the upper dashed line, represents a flow of data to workstation 22, while that below the lower dashed line represents post-processing of the markdown schedules generated by the workstation, e.g., by inventory control systems 12e, 14e, 16e, 18e, workstation 22, itself, or other or otherwise.

With reference to FIG. 3, step 100, data is input to workstation 22 representing pricing, inventory and sales information for those items sold by the retail sites 12-18, . . . , for which markdown pricing is being optimized. This can be for all or a subset of the sites comprising an enterprise or other collection. The input data is used at various steps of the illustrated methodology, as will be evident in view of the discussion below.

Although the methodologies hereof can be practiced with just a few retail sites, a multitude of sites are shown in the drawing. This is to emphasize an advantage of the invention, i.e., that it facilitates markdown pricing determinations for chains (or other collections) which may have tens or hundreds of stores, each selling hundreds or thousands of items. To repeat a point made about this earlier, determining markdown schedules for that many items across that many individual stores normally requires significant processing power and/or time. The invention optimizes markdown scheduling by grouping the sites into common groups or bins and generating schedules for the combined grouping of stores in each bin, rather than for the individual stores, thereby reducing processing overhead (and time), while still optimizing gross margin achieved through sales of those items.

Though data input in step 100 may be for a multitude of items sold by the sites 12-18, . . . , illustrated workstation 22 optimizes markdown scheduling for one item (or group of related items) during each iteration of steps 102-110. In this regard, an item refers to a single type of good, e.g., mens' navy-colored Levi's® 517® loose boot cut jeans. Alternatively, the workstation may optimize markdown scheduling for one set a related items—e.g., mens' Levi's® and Wrangler® jeans—during each illustrated iteration. In this regard, items are considered related if their markdown schedules would be substantially similar, if optimized separately. This is typically the case for fungible items and for items that otherwise have similar pricing characteristics and that face similar demand curves. Examples include children's breakfast cereals, mens' dress shirts, women's dress shoes, and so forth.

Thus, referring to the drawings, in step 102, the workstation begins the markdown scheduling optimization for a single item or group of related items. For sake of brevity and without loss of generality, in the discussion that follows, the term item will be used in place of the phrase item or group of items.

In step 104, the workstation 22 computes a metric for a first level of binning (or grouping) the retail sites 12-18, . . . , with respect to the item for which markdown scheduling is being optimized in the current iteration. For sake of convenience that item is referred to as the "current item" in the discussion that follows. In the illustrated embodiment, the computed metric is a function of current inventory and its expected sales. Particularly, the workstation 22 computes for each of the retail sites a ratio I', defined as follows:

$$I'=I_o/F_o$$

where, $I_o$ is the current inventory of the current item at the retail site, and $F_o$ is expected sales of the current item at the retail site at the current price which that site is selling the item. In alternate embodiments, another price may be used, e.g., initial sales price.

This metric, I', is particularly suited for embodiments, such as those illustrated here, where markdown scheduling is based on a multiplicative demand model; though it can be used in connection with other demand models. Moreover, it will appreciated that metrics other than I', as computed above, can be used in the illustrated embodiment. More generally, other metrics can be used where markdown scheduling is optimized in accord with the teachings hereof, whether using a multiplicative demand model or otherwise.

In the illustrated embodiment, $F_o$ is computed in view of the demand curve (or demand function) experienced by the site for the current item. It is calculated by integrating expected sales of the item according to the demand curve between the current time, $t_o$, and the end of the selling period, or outdate, toot, for the item:

$$F_0 = \int_{t_0}^{tout} S(p_{cur}, t)$$

where, $S(p_{cur}, t)$ is the demand curve as a function of the current price $p_{cur}$ and time.

Calculation of I', as defined in the illustrated embodiment, for all sites 12-18, . . . , can be thought of as producing a histogram-like curve of the number of sites at each value of $I_o + F_o$. Put another way, it can be thought of as the number of sites that are equally close (or far), from (a) selling out inventory, percentage-wise, and/or (b) optimal gross margin, given the current price $p_{cur}$ they respectively set for the current item.

When that demand curve is not known, the current item's demand curve within the enterprise as a whole or within a selected sub-group of stores (e.g., those in the same geographic location, with similar customer demographics, of like store type and theme, and so forth) can be used, as can the demand curve experienced by the industry as a whole or within a selected subset.

Referring to FIG. 2, the illustrated embodiment utilizes a function, module or other code section (or sections) 50, programmed in accord with conventional software engineering techniques to carry out the calculations above, in order to determine I' for each site 12-18, . . . . Results of those calculations are grouped or binned in an array, table, file or other data structure or store 52, as shown. In instances where the calculations result in a continuum of I' values of too fine granularity, those results are quantized to fall into a desired number of slots in structure or store 52. That number is determined empirically, depending on the degree of optimization required of the workstation 52 and its processing resources.

In step 106, the workstation 22 regroups the sites in each of the bins of structure/store 52. This can based on pricing rules utilized at the retail sites and, particularly, is intended to divide the sites in each bin into groups that have in common, vis-a-vis the current item, pricing ladders, markdown calendars, promotion types and dates, and acceptable markdown policies. This can also be based on seasonality and/or demand parameters that will be used to generate markdown schedules for the respective sites in step 108, discussed below.

In the illustrated embodiment, each of these factors are weighted equally and independently for purposes of the regrouping. In other embodiments, the factors are considered in combinations and/or weighted unequally for purposes of the rebinning. As above, this is determined empirically, depending on the degree of optimization required of the workstation 52 and its processing resources.

Results of rebinning step 106 are stored in array, table, file or other data structure or store 56, as shown. This may constitute a set of separate structures, as shown, or a single structure, as is also the case with structure/store 52, discussed above.

Turning, again, to FIG. 3, in step 108, the workstation computes markdown schedules for the combined grouping of sites in each bin or slot of structure/store 56. This is in contradistinction to the prior art which computes such schedules for individual stores. And, it is further distinct from the prior art insofar as the groupings within each slot are selected, through the binning process discussed above, so that generation of the schedule for the collective can be performed with reduced processing time, yet, with sufficient accuracy to optimize gross margins on the current item.

Markdown scheduling for the bins of store/structure 56 can be performed using markdown scheduling techniques known in the art (though, conventionally applied in the art only to individual sites, not to groupings of sites as taught here) and implemented in function, module or other code section (or sections) 58 using conventional software engineering techniques. Though other models may be used, in the illustrated embodiment, element(s) 58 model demand at the sites for the current product using a multiplicative model, e.g., one expressed as a function of the relation:

$$S(p) = B(p_o) * R(p) * \ldots$$

where,

S(p) is a demand function for the item(s) for which markdown pricing is being optimized, p and $p_0$ are price and initial prices, respectively, $B(p_o)$ is a base demand for item(s), R(p) is a price elasticity term for that/those item(s), ... represents other factors in the demand model, such as, seasonality, inventory-effect, and so forth.

More particularly, the demand model used by element(s) 58 of the illustrated embodiment and, indeed, the operation of those element(s) themselves, follow the teachings of Woo et al, "Inventory and Price Decision Support" (U.S. Pat. No. 6,910,017, Jun. 21, 2005), assigned to the assignee hereof and the teachings of which are incorporated herein by reference, in which demand is expressed by the relation:

$$S(t)=N_o*N_c*t^{\gamma}*[e^{-(t/t_{pk})^{\alpha}}+C]$$

where,
S(t) represents gross sales revenues of the item(s) for which markdown pricing is being optimized,
t is time;
$N_o$ is a curve fitting parameter;
$N_c$ is a demand multiplier representing an increase in sales that occurs when price is reduced;
$t_{pk}$ is a time of peak sales;
α and γ are curve fitting constants; and
C is a residual sales rate at large values of t.

In still other embodiments, the demand model used by element(s) 58 of the illustrated embodiment and, indeed, the operation of those element(s), follows the teachings of Woo, "Markdown Management," 20030229502A1, published Dec. 11, 2003, assigned to the assignee hereof, the teachings of which are incorporated herein by reference.

Referring to FIG. 3, in step 110, the workstation outputs the markdown schedules generated by element(s) 58 for the sites in the bins of store/structure 56. That output can be by way of printed or other report showing the respective schedules for use, e.g., by a pricing manager or other personnel, in setting prices at the sites and/or other in connection with other administrative or management function. Alternatively, or in an addition, those schedules can be transmitted to the inventory control systems 12e, 14e, 16e, 18e and/or the sales terminals at the sites 12-18 for use in automatic price setting at point-of-sale, on electronic shelf displays, or otherwise.

Described above are systems and methods meeting the objects of the invention. Those skilled in the art will appreciate that the embodiments shown and discussed here are merely examples of the invention and that other other embodiment incorporating changes therein fall within the scope of the invention. Thus, by way of non-limiting example, it will appreciated that the invention applies equally to optimizing markdown scheduling of services. In this regard, then, the term items applies to goods (as discussed above) and services alike. By way of further example, it will be appreciate that various steps shown in FIG. 3 can be switched. Thus, the order of step 100 and 102 can be switched, e.g., if data is to be collected for one item (or group of related items) at a time; and steps 104 and 106 can be switched, e.g., to effect binning by pricing policy before binning by metrics. In view of these and other caveats.

What we claim is:

1. A method of optimizing scheduling of markdown pricing for one or more related items at a plurality of retail sites, the method comprising:

for each retail site in the plurality of retail sites, identifying a type of related items based, at least in part on, whether markdown schedules for individual items would be substantially similar if optimized separately;

computing, with a digital processing apparatus, a metric I' that is a ratio of a current inventory of the type of related items at that retail site and a number of the type of related items expected to be sold by that retail site;

determining which retail sites from the plurality of retail sites have similar metrics, the metrics identifying which retail sites are equally close to selling out the type of related items by one of, percentage-wise and optimal gross margin, given a current price of the type of related items;

identifying one or more pricing rules utilized at the retail sites, where the one or more pricing rules include at least one of a markdown calendar for each retail site, a promotion type during which a markdown may be scheduled to occur, a promotion date of a markdown, a schedule of accepted markdown dates, or a pricing ladder for permissible markdown prices;

combining the plurality of retail sites into a group as a function of the retail sites having similar metrics and one or more pricing rules utilized at the retail sites;

computing, with the digital processing apparatus, a markdown schedule for the retail sites that make up the group;

displaying on a display screen of the digital processing apparatus the group markdown schedule; and applying the group markdown schedule to the plurality of retail sites of the group to optimize scheduling of markdown pricing.

2. The method of claim 1, where computing the markdown schedule is based on a demand model.

3. The method of claim 2, where computing each markdown schedule is based on the demand model expressed by a relation:

$$S(p)=B(p_o)*R(p)$$

where,
S(p) is a demand function for the type of related items for which markdown pricing is being optimized;
p and $p_o$ are price and initial prices, respectively;
$B(p_o)$ is a base demand for the type of related items;
R(p) is a price elasticity term for the type of related items.

4. The method of claim 3, where the relation of the demand model further comprises seasonality of demand for the type of related items at each retail site and the current inventory of the type of related items at each retail site.

5. The method of claim 1, where computing each markdown schedule based on a demand model is expressed as a function of a relation:

$$S(t)=N_o*N_e*t^{\gamma}*[e^{-(t/tpk)^{\alpha}}+C]$$

where,
S(t) represents gross sales revenues of the type of related items for which markdown pricing is being optimized;
t is time;
$N_o$ is a curve fitting parameter;
$N_C$ is a demand multiplier representing an increase in sales that occurs when price is reduced;
$t_{pk}$ is a time of peak sales;
α and γ are curve fitting constants; and
C is a residual sales rate at large values of t.

6. The method of claim 5, where combining the plurality of retail sites into the group is a function of having a similar metric and one or more of the parameters and constants in the relation identified in claim 5.

7. A computer-readable storage medium having computer-executable instructions stored thereon that when executed by a computer processor cause the computer processor to perform a method, the method comprising:

selecting a type of merchandise based, at least in part, on whether markdown schedules for single merchandise items carried by a plurality of stores would be substantially similar if optimized separately;

computing a metric I' for each store, the metric is a ratio of a current inventory of the type of merchandise at that store and an expected amount of sales of the type of merchandise at that store;

determining which stores have similar metrics, the metrics identifying stores that are equally close to selling out the type of merchandise by one of, percentage-wise and optimal gross margin, given a current price of the type of merchandise;

identifying one or more pricing rules utilized at the stores, where the one or more pricing rules include at least one of a markdown calendar for each store, a promotion type during which a markdown may be scheduled to occur, a promotion date of a markdown, a schedule of accepted markdown dates, or a pricing ladder for permissible markdown prices;

combining stores from the plurality of stores into a group as a function of the stores having a similar metrics and one or more pricing rules utilized at the stores;

computing a markdown schedule for the group to be applied to the type of merchandise; and generating the markdown schedule for application at the stores in the group.

8. The computer-readable storage medium of claim 7, where the function is a ratio of the current inventory of the type of merchandise at that store to the expected amount of sales of the type of merchandise at an initial sales price at that store.

9. The computer-readable storage medium of claim 7, where computing the markdown schedule is based at least in part on a demand model.

10. The computer-readable storage medium of claim 8, where the demand model is determined, at least in part, by computing:

$$S(p)=B(p_o)*R(p)$$

where,

S(p) is a demand function for the type of merchandise for which markdown pricing is being optimized;

p and $p_o$ are price and initial prices, respectively;

$B(p_o)$ is a base demand for the type of merchandise;

R(p) is a price elasticity term for the type of merchandise.

11. The computer-readable storage medium of claim 8, where the demand model is determined, at least in part, by computing:

$$S(t)=N_o*N_c*t^\gamma*[e^{-(t/t_{pk})^\alpha}+C]$$

where,

S(t) represents gross sales revenues of the type of merchandise for which markdown pricing is being optimized;

t is time;

$N_o$ is a curve fitting parameter;

$N_C$ is a demand multiplier representing an increase in sales that occurs when price is reduced;

$t_{pk}$ is a time of peak sales;

$\alpha$ and $\gamma$ are curve fitting constants; and

C is a residual sales rate at large values of t.

12. The computer-readable storage of claim 7, where computing the markdown schedule is based, at least in part, on seasonality of demand.

13. The computer-readable storage medium of claim 7, where generating the markdown schedule further comprises storing the markdown schedule in a memory of a computer system.

14. The computer-readable storage medium of claim 7, where generating the markdown schedule further comprises transmitting the markdown schedule to each store in the group for purposes of automatic control of the type of merchandise with respect to that store.

* * * * *

UNITED STATES PATENT AND TRADEMARK OFFICE
CERTIFICATE OF CORRECTION

| | | |
|---|---|---|
| PATENT NO. | : 7,979,299 B1 | Page 1 of 1 |
| APPLICATION NO. | : 11/158264 | |
| DATED | : July 12, 2011 | |
| INVENTOR(S) | : Mehta et al. | |

It is certified that error appears in the above-identified patent and that said Letters Patent is hereby corrected as shown below:

In column 7, line 10, delete " $S(t)=N_o*N_c*t^\gamma*[e^{-(t/t_{pk})^\alpha}+C]$ " and insert -- $S(t)=N_o*N_c*t^\gamma*[e^{-(t/t_{pk})\alpha}+C]$ --, therefor.

In column 8, line 46, in Claim 5, delete "$N_e$" and insert -- $N_c$ --, therefor.

In column 8, line 53, in Claim 5, delete "$N_C$" and insert -- $N_c$ --, therefor.

In column 10, line 18, in Claim 11, delete "$N_C$" and insert -- $N_c$ --, therefor.

Signed and Sealed this
Fifteenth Day of November, 2011

David J. Kappos
*Director of the United States Patent and Trademark Office*